United States Patent

Elliott

[15] 3,648,173

[45] Mar. 7, 1972

[54] TIME RECOVERY SYSTEM FROM A PULSE-MODULATED RADIO WAVE

[72] Inventor: Henry H. Elliott, Bethesda, Md.

[73] Assignee: The United States of America as represented by the Secretary of the Navy

[22] Filed: Aug. 7, 1970

[21] Appl. No.: 61,892

[52] U.S. Cl. ................................325/58, 58/24 R, 325/321, 343/225

[51] Int. Cl. ........................................H04b 7/00, G04c 13/02

[58] Field of Search .............343/100 ST, 205, 226; 325/321, 325/322, 325, 363, 364, 4, 58; 58/35 W, 24 R; 328/109, 139; 307/233

[56] References Cited

UNITED STATES PATENTS 3,472,019 10/1969 Webb.....................................58/24 R

*Primary Examiner*—Robert L. Griffin
*Assistant Examiner*—George G. Stellar
*Attorney*—Richard S. Sciascia, John O. Tresansky and J. A. Cooke

[57] ABSTRACT

Satellites of the Navy Navigation Satellite System continuously transmit a carrier frequency which is phase modulated with a precisely timed, recurrent phase modulation pattern synchronized to Naval Observatory time. The recurrent phase modulation pattern is a continuous stream of binary bits and comprises a message portion which occurs at a predetermined bit rate and a marker word which occurs at a fixed position in each recurrent modulation pattern and is composed of a signal having a frequency which is a known multiple of the message portion bit rate. Accurate time recovery of the satellite-transmitted signal is accomplished by multiplication of the message portion bit rate to the frequency of the time marker word or signal and subsequently phase comparing the bit rate-derived signal with the incoming satellite signal and producing a pulse when phase coincidence occurs which, in turn, allows examination of a particular multiplied message cycle segment. When this segment is detected a fiducial time mark pulse is produced.

10 Claims, 2 Drawing Figures

Figure 1:
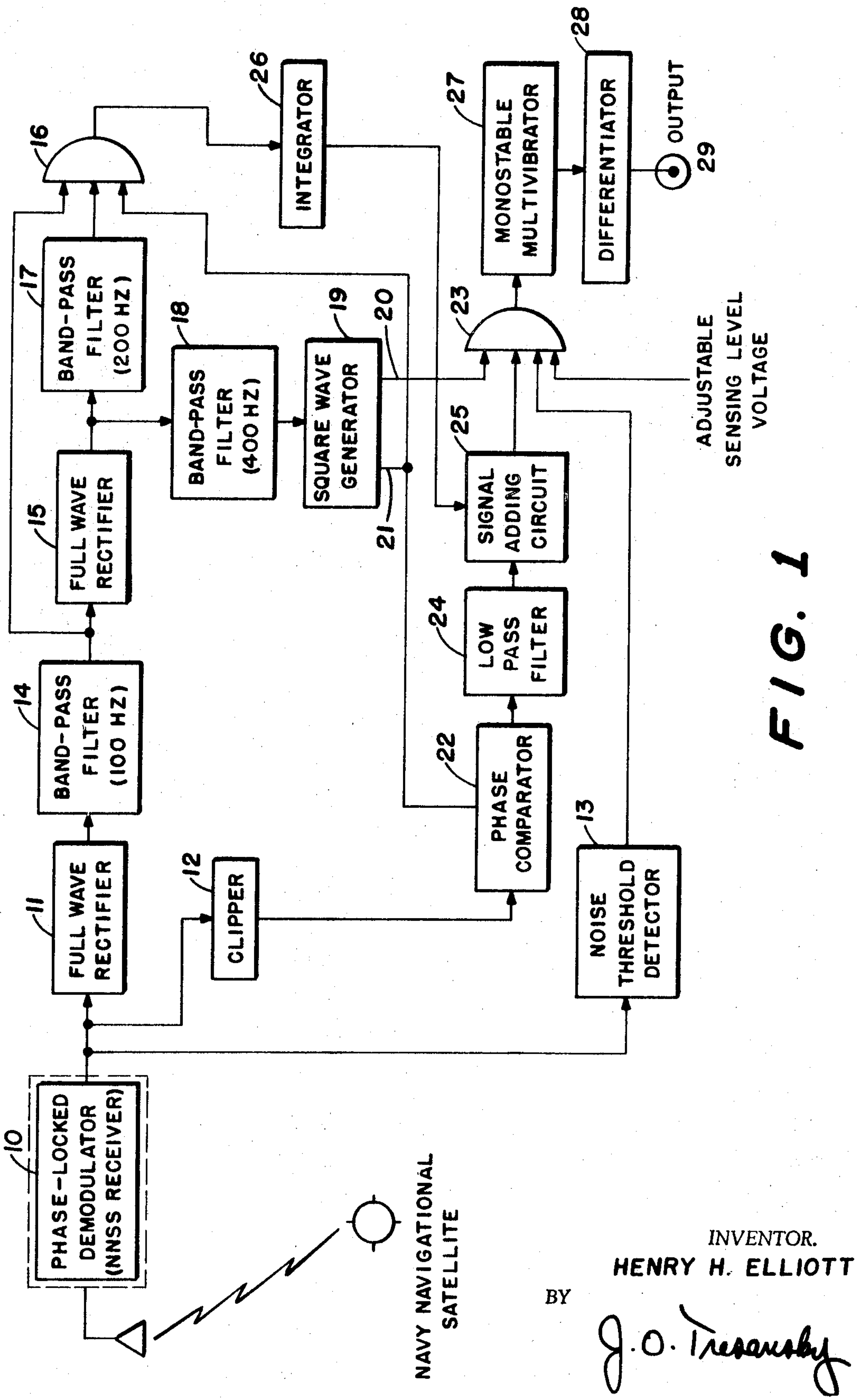

INVENTOR.
HENRY H. ELLIOTT
BY J. O. Tresansky

INVENTOR.
HENRY H. ELLIOTT

TIME RECOVERY SYSTEM FROM A PULSE-MODULATED RADIO WAVE

BACKGROUND OF THE INVENTION

A worldwide navigation system, based on the measurement of the doppler shift of stable signals transmitted from orbiting artificial earth satellites, has been developed for and made operational by the United States Navy and has become known as the Navy Navigation Satellite System. The satellites of this system are in near circular orbits approximately 600 nautical miles above the earth, with the number of satellites such that one satellite is visible from any one place on the earth for a "-pass" time of about 15 minutes. Each of the satellites of this system transmits continuously, with a precisely timed 2-minute recurrent pattern of modulation on carrier frequencies of approximately 150 and 400 megacycles. Consequently, several of the recurrent messages transmitted by a given satellite would be received at any one place on earth during each "-pass."

The phase modulation pattern continuously transmitted recurrently by each satellite is a continuous stream of binary bits, divided into bit words, and comprising a series of messages each lasting precisely 2 minutes. This 2-minute pattern is maintained in precise time synchronism with Naval Observatory time. Moreover, each recurrent modulation pattern includes, in addition to the main message portion which lasts approximately 119.3 seconds and whose content may vary, certain marker words which consume approximately 0.7 second and whose bit structure never changes and heretofore have been utilized to mark the beginning of each message. One such marker word is known as the "beep word." It is proposed, in accordance with the present invention, to utilize this "beep word" for time recovery purposes, i.e., in order to enable a person on the earth to determine accurately the time of day. This is accomplished by an addition of apparatus, in accordance with the present invention, to the conventional phase-locked receiver-demodulator apparatus normally employed in the Navy Navigation System.

SUMMARY OF THE INVENTION

It is proposed in accordance with the present invention to provide a time recovery system which takes advantage of the precisely timed marker signals being continuously transmitted by the Navy Navigational Satellites and produces fiducial time marker pulses in response thereto. In this manner, and depending upon the reoccurrence frequency of the satellite-transmitted signals, a user on earth will be able to accurately adjust his own clocks with the Naval Observatory time. In one practical embodiment of the present invention, the recurrent modulation pattern is transmitted by the satellite every 2 minutes so that time marker pulses 2 minutes apart are available to the user.

More specifically, the proposed time recovery apparatus of the present invention detects the time marker signal portion of the satellite-transmitted information (e.g., the "beep word"), by multiplying the satellite half-bit data rate to a frequency equal to that of the time marker signal and then phase comparing this produced signal with the satellite signals being received. When the time marker signal occurs, the phase comparator outputs a pulse which is passed through a low-pass filter and signal enhancing circuitry to increase the signal-to-noise ratio. This improved, detected signal is then applied as one input to an AND gate which is also provided with an input from a noise threshold detector circuit which senses when excessive noise is occurring. If excessive noise is not occurring, the AND gate, in turn, produces an output pulse which accurately identifies the occurrence of a preselected segment of the multiplied message portion and which is utilized to trigger a monostable multivibrator each time the satellite-transmitted time marker signal is detected, in order to produce an output pulse which accurately demarcates the occurrence of such time markers and may thus be used as a time fiducial marker on earth, by the user, e.g., to operate a visual or audible alarm or some other indicator device by which the user can accurately adjust his own clocks to be in agreement with Naval Observatory time.

In view of the above, one object of the present invention is to provide a time recovery system which operates in conjunction with the Navy Navigation Satellite System or other similar artificial earth satellite system.

Another object of the present invention is to provide a time recovery system capable of accurately detecting the time marker signal portions of the precisely timed signals continuously transmitted, for example, by Navy Navigational Satellites in order to produce fiducial time marker pulses by means of which a user on earth can accurately synchronize his clock(s) with a known time reference such as Naval Observatory time.

Another object of the present invention is to provide time recovery system wherein fiducial time marker pulses are produced from signals which are continuously transmitted, for example, by Navy Navigational Satellites and which are maintained in precise time synchronism with a known time reference such as Naval Observatory time and wherein provision is made to prevent noise from interfering with proper operation of the time recovery system.

Figure 2:
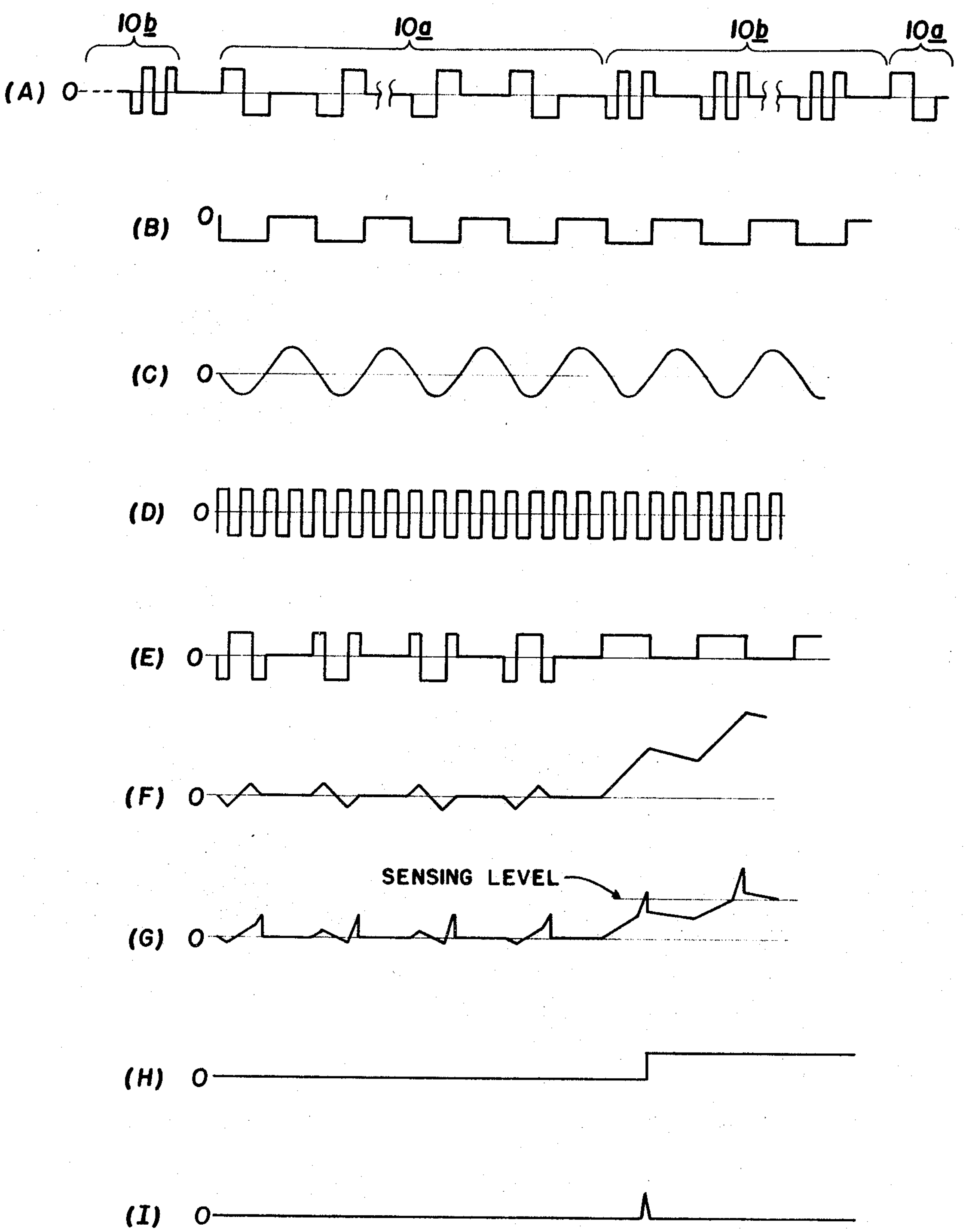

Other objects, purposes and characteristic features of the present invention will in part be pointed out as the description of the present invention progresses and in part be obvious from the accompanying drawings wherein:

FIG. 1 is a block diagram of one embodiment of the time recovery apparatus proposed in accordance with the present invention; and FIG. 2 illustrates various waveforms useful in explaining the operation of the apparatus of FIG. 1.

As mentioned previously, the time recovery system and apparatus of the present invention is particularly adapted for operation in conjunction with the well-known Navy Navigational Satellite System. More specifically, the proposed time recovery apparatus of the present invention is specifically designed to utilize or respond to the time marker signals (e.g., so-called "beep word") contained in the recurrent phase modulation pattern continuously transmitted by the satellites of this Navy Navigational Satellite System and which are kept in precise synchronism with Naval Observatory time. In other words, the "beep word" marker signals are accurately detected and used to generate or produce very precise fiducial time marker pulses, occuring every 2 minutes, for example, by which users stationed anywhere upon the surface of the earth can readily keep their own clocks accurately synchronized with the known time reference, e.g., Naval Observatory time.

As is well known to those familiar with the Navy Navigational Satellite System, the recurrent phase modulation pattern continuously being transmitted by the satellites of this system is normally received and demodulated by phase-locked receiver-demodulator apparatus of well-known design. Referring now to FIG. 1 of the drawings, the phase-locked demodulator of the well-known type contained in the receiver employed in the *N*avy *N*avigation *S*atellite *S*ystem (NNSS) is represented by the block 10, shown within the dotted lines representing the NNSS receiver unit, and typically produces a detected signal such as that illustrated at waveform A of FIG. 2. As shown in this waveform, the output signal from the phase-locked demodulator 10 comprises a recurrent modulation pattern having message portions **10*a* whose beginnings are demarcated by a time marker portion or "beep word" 10*b*** which is composed, for example, of a 400-Hertz signal; whereas, the message portion of the detected signal includes a group of binary bits occurring typically at a bit rate of 50 bits per second. Each bit in the message portion is comprised of a double-doublet type signal, e.g., a binary one could be represented by a plus-minus pulse pair followed by a minus-plus pulse pair, and a binary zero would be represented by a minus-plus pulse pair followed by a plus-minus pulse pair. It should be understood at this time that the waveform A is for illustration only and that, in reality, the message portion of the satellite transmission consumes much more time than the time marker portion, as previously mentioned.

The time recovery apparatus of the present invention responds to the output (waveform A) from the phase-locked demodulator 10 and performs accurate time recovery, by multiplying the bit rate (e.g., 50 bits/second) of the modulation signal to equal the frequency of the "beep word" (e.g., 400 Hertz) and producing a time fiducial marker pulse output when phase coincidence occurs between the bit rate-developed signal and the "beep word" signal. Inasmuch as the "beep word" signal is time synchronized with Naval Observatory time, the time marker pulses generated or produced when this phase coincidence occurs are also time synchronized with Naval Observatory time and therefore can be relied upon, by a user, for the purpose of maintaining his own station clock(s) in synchronism with this well-known time reference. For example, at the present time, the recurrent pattern transmitted by the Navy Navigation Satellites occurs every 2 minutes and consequently, a user would more than likely be able to correct his clocks to the nearest one-half second by merely noting the output marker pulses or to the nearest 10 milliseconds by comparing such output marker pulses with the station clock(s) by means of an oscilloscope. It should be understood at this time that the time recovery process just described will afford sufficient accuracy for most purposes. On the other hand, a user can, of course, attain an even more accurate indication of the basic time reference by also taking into consideration such factors as: any satellite clock error, the propagation time from the satellite to the user station, and any signal delay in the receiving equipment.

As shown in FIG. 1 of the drawings, the detected output signal from the phase-locked demodulator 10 is applied simultaneously to a full-wave rectifier 11, clipper 12, and noise threshold detector 13. The full-wave rectifier 11 may be of any well-known design and operates in a conventional manner to produce an output square wave signal, such as that shown in waveform B in FIG. 2, having a frequency of twice the input bit rate or 100 Hertz through out reception of a satellite transmission.

The output signal from the full-wave rectifier 11 is applied to a 100-Hertz band-pass filter 14 which preferably has a noise bandwidth of approximately 5 Hertz so as to provide an output signal which is relatively noise free. The output of the band-pass filter 14 is an essentially sinusoidal signal, at 100 Hertz, as shown at waveform C in FIG. 2. This signal is applied to full-wave rectifier 15 and to one input of a three-legged AND-gate 16. The output of the full-wave rectifier 15 is composed of a 200-Hertz signal, plus harmonics, and is applied to a 200-Hertz band-pass filter 17 and a 400-Hertz band-pass filter 18. The output of the band-pass filter 17 is connected to a second input of the AND-gate 16; whereas, the 400-Hertz output signal from the band-pass filter 18 is applied to a square wave generator 19 which may be of any conventional design capable of producing a pair of antiphase 400-Hertz square wave signals; one of which (that appearing on output line 20) is illustrated at waveform D in FIG. 2. The second output from the square wave generator 19 (on output line 21) would be 180° out of phase with the output signal illustrated at waveform D in FIG. 2.

With reference to waveforms A and D of FIG. 2, it should be noted that the square wave appearing on line 20, at the output of square wave generator 19, is out of phase with the "-beep word" signal **10*b* contained in the output from demodulator 10 (waveform A) and therefore, the other output of the square wave generator 19; i.e., that appearing on output line 21, is in phase with the "beep word" signal 10*b*. This in-phase output on line 21 i.e., in phase with the "beep word" signal) is applied to a phase comparator 22 where it is utilized as a reference for phase comparison against the demodulator output signal (waveform A), after clipping at clipper 12, and is also applied to the remaining input of the AND-gate 16. The second or out-of-phase output from the square wave generator 19 (appearing on line 20) is applied to one input of a second three-legged AND-gate 23. The purpose of the utilizing two outputs from the square wave generator 19 is to provide isolation between the phase comparator 22, where considerable noise is present, and the output from band-pass filter 18**, where the noise bandwidth is quite small, e.g., 2.5 Hertz.

As mentioned previously, the comparator 22 is of conventional design and operates to produce an output which is positive, relative to its zero or reference output level, when its two inputs are of the same polarity or, in other words, are in phase with one another and, it produces a negative output level when its two inputs are out of phase. A typical output signal from the phase comparator 22 is illustrated at waveform E in FIG. 2; wherein, it should be noted that occurrence of the "-beep word" **10*b* causes the output from the phase comparator 22 to remain at a positive level longer than when the message portion 10*a* of the input signal is being compared against the output 21 of square wave generator 19, As noted earlier, this condition results from the fact that the output 21 from square wave generator 19**, as derived from the basic message bit rate, is of the same frequency and phase as the "beep word."

The output from the phase comparator 22, waveform E in FIG. 2, is applied to a low-pass filter network 24 which effectively integrates this input signal to produce an output signal such as that shown at waveform F in FIG. 2. It will be noted that during the message portion **10*a* of the detected satellite signal (waveform A), the output of the phase comparator 22 is positive and negative for equal amounts of time and consequently, the output of low-pass filter 24 returns to its zero or reference level after each pulse pair or doublet contained in the message portion 10*a* of the input signal. On the other hand, when the "beep word" is occurring, the output level from the comparator (waveform E) stays positive for a longer time and does not go negative. As a result, the output of low-pass filter 24 increases as a stepped ramp function, with very little decrease in the filter output level during the time intervals between the various bursts (totaling 78) comprising the "-beep word" portion of the input signal, as shown in waveform F. The output signal from the low-pass filter 24 is applied to signal adding circuit 25**.

The three signals applied to the AND-gate 16, namely, the 100-Hertz output from band-pass filter 14, the 200-Hertz output from band-pass filter 17, and the 400-Hertz output square wave appearing at output line 21 from generator 19, are phased in such a manner as to produce positive pulses at the output of AND-gate 16, at the 100-Hertz rate and positioned near the end of the negative portion of the 100-Hertz signal (waveform C) from the output of the band-pass filter 14. These positive output pulses from AND-gate 16 are integrated, at integrator 26, and applied as a second input to the signal adding circuit 25. The signal-adding circuit 25 combines its two inputs to produce an output signal illustrated at waveform G in FIG. 2. This output signal from the signal adding circuit 25 is applied as a second input to the AND-gate 23 and enables the AND-gate 23 when the signal from circuit 25 reaches a predetermined sensing level set by an adjustable voltage input to the AND-gate 23 as shown in FIG. 1. This sensing level voltage is adjusted to about 80 percent of the output pulse amplitude from the signal adding circuit 25 at the end of the first "beep word" burst with no noise present. Thus, the output signal from the adding circuit 25 is used to select one of the pulses contained in the output 20 from square wave generator 19 and gate it through AND-gate 23 to a monostable multivibrator 27. As shown in FIG. 2 of the drawings, the particular pulse signal segment selected is the beginning of the third cycle of the square wave output 20 after the beginning of the "beep word." This selected or gated pulse is applied to and triggers the monostable multivibrator 27 to generate an output timing pulse, shown in waveform H of FIG. 2, which is subsequently differentiated at 28. Consequently, a sharp pulse (waveform I) appears at output terminal 29 to accurately demarcate the occurrence of each beep word in the satellite transmission. Inasmuch as these "beep words" are precisely synchronized with Naval Observatory even minute marks, the output timing pulses appearing at terminal 29 are thus fiducial time markers which may be utilized by the user to accurately set his own clocks. These time mark pulses could be brought to the user's attention by either audible or visual means actuated by the pulses appearing at the output terminal 29.

As noted earlier, the noise threshold detector 13 also receives the input signal from the phase-locked demodulator 10 and operates to disable the AND-gate 23 whenever the input noise level increases to a predetermined value, in order to prevent false timing pulses from being produced as a result of excessive noise. The noise threshold detector circuitry 13 may be of any suitable design capable of producing a disabling voltage level to the AND-gate 23 when the input signal-to-noise ratio fails to achieve a predetermined value, e.g., approximately +8 db. signal-to-noise ratio in a 1-kilohertz noise bandwidth.

Many modifications, adaptations and alterations of the present invention are of course possible in the light of the above teachings. Therefore, it should be understood at this time that within the scope of the appended claims, the invention may be practiced otherwise than as specifically described hereinabove.

What is claimed is:

1. In combination with an artificial earth satellite communication system wherein receiver-demodulator apparatus receives and demodulates communication messages continuously transmitted by a satellite in the form of a recurrent pattern of modulation on a carrier frequency, said recurrent modulation pattern being maintained in precise time synchronization with an earth time reference and containing a message portion formed of binary bit words occurring at a predetermined bit rate and a time marker word portion which occurs at a fixed position in said recurrent modulation pattern and is composed of a signal having a frequency which is a known multiple of said predetermined bit rate, a time recovery system for producing fiducial time markers synchronized to said time reference and comprising, means connected to said receiver-demodulator apparatus for deriving from the bit rate of said message portion a signal having the same frequency and phase as that of said time marker word, phase comparator means connected to said receiver-demodulator means and said signal-deriving means for phase-comparing said derived signal with said demodulated satellite messages, and means responsive to the phase comparison performed by said phase comparator means for producing an output pulse representing a fiducial time marker each time phase coincidence occurs between said derived signal and said time marker word portion of said recurrent modulation pattern.

2. The combination specified in claim 1 wherein said satellite communication system is the Navy Navigational Satellite System and said earth time reference is Naval Observatory time.

3. The combination specified in claim 1 wherein said time recovery system further includes means responsive to the noise level existing in said received satellite communication messages to prevent excessive noise from producing faulty fiducial time marker pulses.

4. The combination specified in claim 1 wherein, said message portion of said demodulated satellite communication message contains a double-pulse doublet for each binary bit therein, said time marker word portion of said demodulated satellite communication message contains a group of square wave bursts whose frequency is a known multiple of the bit rate employed in said message portion, said signal deriving means includes means for multiplying the bit rate of said message portion to equal the frequency of said time marker word portion and a square wave generator controlled by said multiplication means to generate an output square wave having the same frequency and phase as the square wave bursts constituting said time marker word, said phase comparator means being connected to compare the output of said square wave generator with said demodulated satellite messages and producing a first output signal which has a zero-integrated value during said message portion of said demodulated satellite message and a second output signal which has a nonzero integrated value during said time marker word portion of said demodulated satellite message, and said fiducial time marker pulse producing means includes means rendered effective by the nonzero integrated value of said phase comparator output signal to produce an output pulse demarcating each occurrence of said time marker word in said demodulated satellite messages.

5. The combination specified in claim 4 wherein said fiducial time marker pulse producing means includes, integrator means operably connected to integrate the output signals from said phase comparing means and producing a zero integrated output during the message portion of said demodulated satellite message and a nonzero, stepped ramp integrated output during the square wave bursts comprising said time marker portion of said demodulated satellite message, an AND gate circuit means, a first input to said AND gate circuit means operably connected to said square wave generator, a second input to said AND gate circuit means operably connected to receive the integrated output from said integrator means, a source of adjustable sensing level voltage, a third input to said AND gate circuit means operably connected to said adjustable sensing level voltage source, and a monostable multivibrator operably connected to the output of said AND gate circuit means and being triggered to produce an output pulse by the output from said square wave generator when the integrated output of said integrator means exceeds said sensing level voltage and enables said AND gate circuit means.

6. The combination specified in claim 5 further including, noise threshold detector means for detecting whether the noise level existing in said received satellite communication messages is exceeding a predetermined level, and a fourth input to said AND gate circuit means operably connected to said noise threshold detector means for inhibiting said AND gate circuit means when said existing noise level exceeds said predetermined level.

7. The combination specified in claim 4 wherein said bit rate multiplying means includes full-wave rectifier means and band-pass filter means.

8. The combination specified in claim 5 further including, signal adding means operably connected between said integrator means and said second input to said AND gate circuit means, and means operably connected to said multiplying means and said square wave generator for producing a pulse in time coincidence with a predetermined one of the square wave output pulses from said square wave generator and the maximum level of each ramp integrated output from said integrator means.

9. The combination specified in claim 8 further including, noise threshold detector means for detecting whether the noise level existing in said received satellite communication messages is exceeding a predetermined level, and a fourth input to said AND gate circuit means operably connected to said noise threshold detector means for inhibiting said AND gate circuit means when said existing noise level exceeds said predetermined level.

10. The combination specified in claim 9 further including a differentiator circuit means operably connected to said monostable multivibrator for differentiating the output pulse from said monostable multivibrator to produce a sharp pulse representing a fiducial time marker.